(No Model.)  2 Sheets—Sheet 1.

J. G. WEBB.
ICE CREAM FREEZER.

No. 332,466.  Patented Dec. 15, 1885.

WITNESSES  INVENTOR (No Model.) 2 Sheets—Sheet 2.

J. G. WEBB.
ICE CREAM FREEZER.

No. 332,466. Patented Dec. 15, 1885.

WITNESSES
H. J. Cambridge
R. A. Young

INVENTOR
Jesse G. Webb
By H. Teschemacher
Atty

UNITED STATES PATENT OFFICE.

JESSE G. WEBB, OF BOSTON, MASSACHUSETTS.

ICE-CREAM FREEZER.

SPECIFICATION forming part of Letters Patent No. 332,466, dated December 15, 1885.

Application filed August 25, 1885. Serial No. 175,338. (No model.)

*To all whom it may concern:*

Be it known that I, JESSE G. WEBB, a citizen of the United States, residing at Boston, in the county of Suffolk and State of Massachusetts, have invented certain Improvements in Ice-Cream Freezers, of which the following is a full, clear, and exact description, reference being had to the accompanying drawings, making part of this specification, in which—

Figure 1:
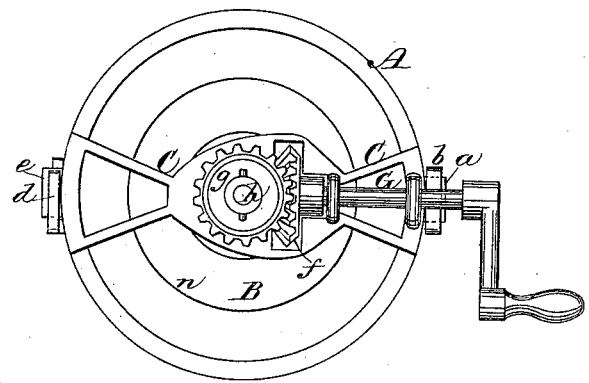
Figure 2:
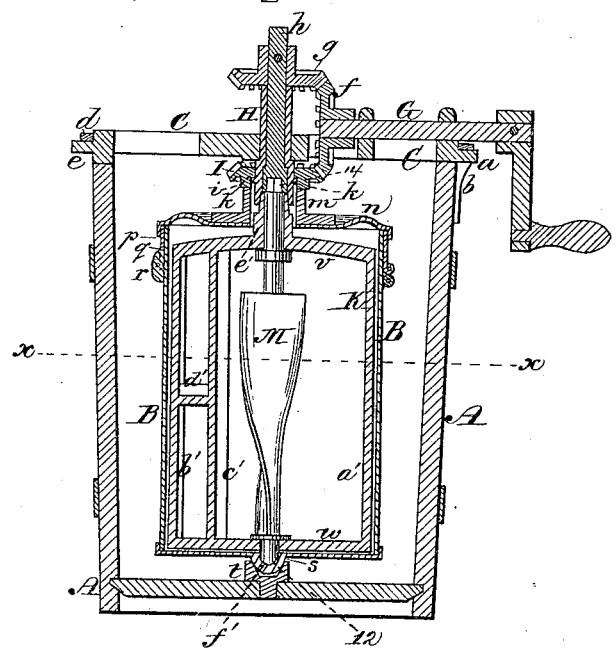
Figure 3:
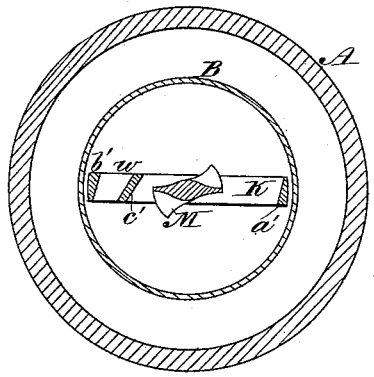
Figure 6:
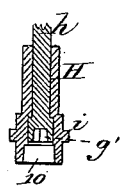
Figure 4:
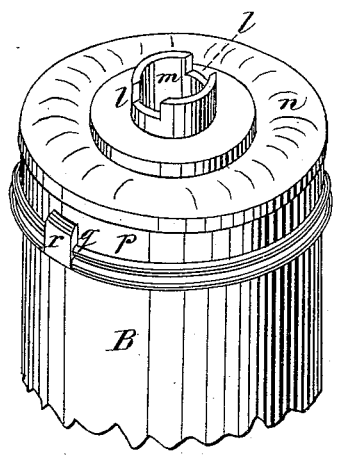
Figure 7:
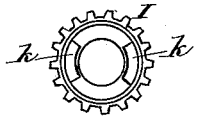
Figure 5:
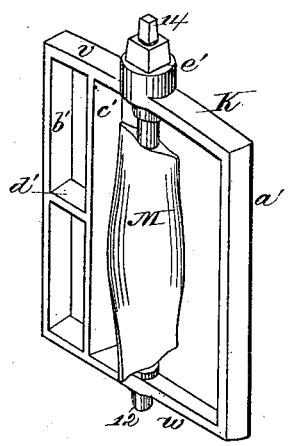

Figure 1 is a plan of an ice-cream freezer constructed in accordance with my invention. Fig. 2 is a vertical section through the center of the same. Fig. 3 is a transverse section on the line *x x* of Fig. 2. Fig. 4 is a perspective view of the upper portion of the cream-can and its cover. Fig. 5 is a perspective view of the scraper or stirrer and the central screw-shaft which revolves therein. Fig. 6 is a sectional detail. Fig. 7 is a plan of the under side of the lower gear which rotates the cream-can.

My invention has for its object to provide a simple and effective means for agitating the cream at the center of the cream-can and throwing it outward toward the periphery, where it becomes mixed with the frozen cream scraped from the sides of the said can.

To this end my invention consists in the combination, with a rotating cream-can having at its center a vertical rotating spirally-twisted blade or screw-shaft, of a scraper having an inner vertical bar inclined in the direction of its width toward the central rotating screw-shaft and arranged in close proximity therewith, whereby the frozen cream as it is removed from the sides of the can by the scraper is forced toward the center to take the place of that forced outward by the screw-shaft, as hereinafter set forth.

My invention also consists in certain combinations of parts and details of construction, as hereinafter set forth and specifically claimed.

In the said drawings, A represents the ice-tub, and B the cream-can, the usual annular space being left between the two for the reception of the salt and ice or other refrigerating materials.

C is the detachable yoke, which extends transversely across the top of the ice-tub A, being secured in position at one end by a projection, *a*, extending under a loop, *b*, on the outside of the tub, and at the opposite end by a swinging latch or hook, *d*, which fits over a projection, *e;* but any other suitable fastening device may be employed, if preferred. The crank-shaft G is mounted horizontally in suitable bearings in the yoke C, and carries at its inner end a bevel-gear, *f*, which meshes with a gear, *g*, secured to the upper end of a short vertical shaft, *h*, which fits within a vertical sleeve or bearing, H, passing through the center of the yoke C and secured immovably thereto, and on this sleeve H, between a shoulder, *i*, Fig. 6, at its lower end and the under side of the yoke C, revolves loosely a bevel-gear, I, which also meshes with the gear *f*. This bevel-gear I is provided on its under side with two lugs, *k k*, which fit into corresponding notches, *l l*, Fig. 4, in the neck or flange *m*, at the center of the cover *n* of the cream-can B, the downwardly-projecting flange *p* of which is provided with a notch, *q*, which fits over a projection, *r*, on the body of the can, whereby as the cover *n* is rotated through the connections described the body of the can will be revolved in the same direction, a central rounded projection, *s*, at the center of the under surface of the bottom of the can resting in a step, *t*, at the bottom of the ice-tub A, which forms a support therefor.

The above-described method of connecting the cover of the cream-can with the rotating mechanism obviates the necessity of securing a gear to the cover, and is a neat and convenient arrangement whereby the liability of soiling the hands with oil or grease in handling the cover is avoided.

K is the scraper or stirrer, which fits within the cream-can B, and consists of a frame composed of the horizontal top and bottom bars, *v w*, and vertical bars *a' b' c'*, the latter two being connected at the center by a short transverse bar, *d'*. The upper bar, *v*, is provided at the center with a hollow stud or nipple, *e'*, which fits within the central aperture of the cover *n*, and is made square at its upper end, so as to fit within a correspondingly-shaped socket, 10, Fig. 5, at the lower end of the stationary sleeve H, whereby the scraper or stirrer is held stationary while the cream-can B is rotated around it. Through the stud *e'* passes the upper end of a central screw-shaft, M, the lower end of which passes through and below the bottom bar, *w*, of the scraper K, and revolves freely therein, the lower rounded end, 12, of the shaft M fitting into a step or socket, *f'*, at the center of the bottom of the can B, whereby it is held in its proper central position, together with the lower end of the scraper K, through which it passes. The upper end, 14, of the screw-shaft M is squared and fits within a square socket, *g'*, Fig. 6, at the lower end of the vertical shaft *h*, from which it receives a rotary motion by means of the gears *g f* and crank-shaft G. The screw-shaft M, which consists of a spirally-twisted blade having more or less pitch, as desired, serves to agitate the cream at the center of the can B, and allows no portion whatever to remain at rest, the liquid cream being, by the action of this screw-shaft M, thrown outward toward the periphery of the can, where it becomes mixed with the frozen cream scraped off the sides of the can by the action of the vertical bars *a' b'* of the scraper K as the can is revolved around it. The inner vertical bar, *c'*, is inclined in the direction of its width toward the rotating screw-shaft M, as seen in Figs. 3 and 5, whereby it is caused to force the frozen cream toward the center to take the place of the liquid or soft cream forced outward by the screw-shaft M, and in this manner all portions of the cream are rapidly and successively brought into contact with the cold sides of the can B, as required, to produce the best results, the several parts when constructed and operating as described greatly facilitating the operation of freezing the cream and reducing the time required therefor to a minimum.

What I claim as my invention, and desire to secure by Letters Patent, is—

1. In an ice-cream freezer, the combination, with a rotating cream-can having at its center a vertical rotating spirally-twisted blade or screw-shaft, of the scraper K, having an inner vertical bar, *c'*, inclined in the direction of its width toward the central rotating screw-shaft, and arranged in close proximity therewith, whereby the frozen cream, as it is removed from the sides of the can by the scraper, is forced toward the center to take the place of that forced outward by the screw-shaft, substantially as described.

2. In an ice-cream freezer, the combination, with the rotary cream-can B and its scraper K, of the vertical spirally-twisted blade or screw-shaft M, having its bearings in the top and bottom bars of the said scraper, and forming a central support therefor, the yoke C, carrying the crank-shaft G, the gears *f g* I, sleeve H, and the vertical shaft *h*, whereby the can B and screw-shaft M are rotated and the scraper held stationary, substantially as described.

3. In an ice-cream freezer, the cream-can B, having a cover, *n*, provided at its top with a central neck or flange, *m*, having notches *l*, in combination with the gear I, having lugs or projections *k*, adapted to fit within the notches *l*, the detachable yoke C, the tub A, the gear *f*, and the crank-shaft G, all operating substantially in the manner and for the purpose set forth.

4. In an ice-cream freezer, the combination of the tub A, the detachable yoke C, secured thereto and provided with a vertical sleeve or bearing, H, the cream-can B, rotating within the tub, and provided with a cover, *n*, having a neck or flange, *m*, provided with notches *l*, the gear I, with its lugs *k*, fitting within said notches *l* and revolving loosely on the sleeve H, the stationary scraper or stirrer K, having a stud or nipple, *e'*, fitting within a socket at the end of the sleeve H, the vertical shaft *h*, rotating within the sleeve H, and carrying the gear *g*, and having at its lower end a socket, *g'*, the central vertical screw-shaft, M, rotating in bearings in the scraper K, and fitting at its upper end within the socket *g'* of the shaft *h*, and the crank-shaft G, with its gear *f*, meshing with the gears *g* I, all constructed and arranged to operate substantially in the manner and for the purpose described.

Witness my hand this 22d day of August, A. D. 1885.

JESSE G. WEBB.

Witnesses:
P. E. TESCHEMACHER,
W. J. CAMBRIDGE.